United States Patent Office 2,831,818
Patented Apr. 22, 1958

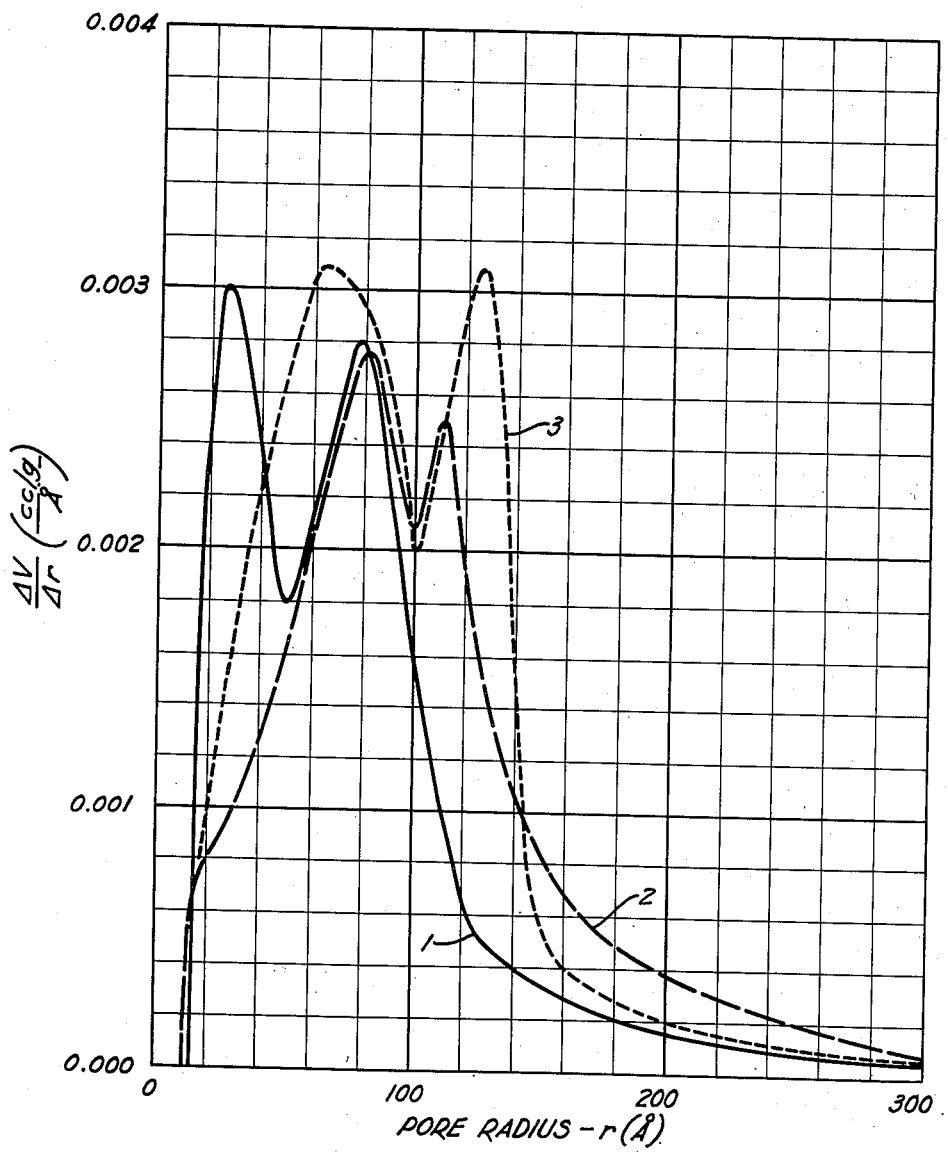

2,831,818
GRANULAR ADSORBENT FOR SUGAR REFINING

Elliott P. Barrett, Baltimore, Md., assignor to Baugh and Sons Company, Baltimore, Md., a corporation of Pennsylvania Application February 8, 1955, Serial No. 486,872

4 Claims. (Cl. 252—424)

This invention relates to the refining of sugar, and more particularly to new adsorbents adapted to replace those used heretofore for that purpose.

For at least one hundred years, and up to recently, bone char, or animal charcoal, was the standard adsorbent in the purification of raw sugar for the removal of color and ash-forming mineral matter, the primary criteria for such a material. Additionally, bone char supplied satisfactorily the other requirements of a sugar refining adsorbent, namely, alkaline buffering power, i. e., the ability to keep the raw sugar solution at a hydrogen ion concentration suppressing the production of substantial amounts of invert sugar, as well as bulk density and resistance to crushing and abrasion requisite in the refining operation and in periodic regeneration of the char.

Much of the bone used for making bone char originates outside of this country, and for various reasons it is at times difficult or impossible for raw bone from foreign sources to reach this country, at least in amounts requisite to supply domestic requirements. In consequence, many attempts to supply satisfactory substitutes for sugar refining have been made. The only materials known to me that have been accepted as substitutes for bone char are heat hardened products comprising synthetic basic calcium phosphate at least as alkaline as hydroxyapatite (referred to hereinafter as BCP), clay and carbonaceous material. BCP products of this type have been developed that possess the attributes required of a sugar refining adsorbent at least equal to those of bone char, and they have been and are being used extensively in place of bone char for that purpose. A particular advantage of these synthetic adsorbents is that they retain their activity level over more cycles of use and regeneration than bone char.

One method of preparing such synthetic adsorbents is disclosed and claimed in Patent No. 2,352,932 to James R. West and the present applicant. Briefly, a basic calcium phosphate at least as alkaline as hydroxyapatite $[Ca_3(PO_4)_2 \cdot \frac{1}{3} Ca(OH)_2]$ is formed in contact with clay and a carbonizable organic material under such conditions as to produce a homogeneous mixture of the three. According to the patented invention that is accomplished by reacting a calcium compound, such as lime (CaO), and phosphoric acid ($H_3PO_4$) or other reactive phosphate (e. g., calcium phosphates, superphosphates, etc.) in a suspension of the clay and carbonizable organic material, such as starch, in an alkaline aqueous medium whereby the BCP is formed in contact with and deposited on the clay and starch. The solids are recovered, as by filtration, washed free from water-soluble matter and formed into shapes, as by extrusion, that are then dried, crushed and screened to appropriate sizes that are then heated to effect carbonizing of the carbonizable material and to harden the shapes through the bonding action of the clay. The final heating is at a temperature below that which causes the clay to vitrify, and it is conducted in the substantial absence of air.

Products made from synthetic BCP, clay and carbonizable matter when thoroughly mixed, gauged with water, and extruded under high intensity shearing stresses possess hardness and bulk density comparable to those of bone char while at the same time they are at least equal to bone char in decolorizing power, ash-removing power and alkaline buffering power. At the same time they possess a more favorable distribution of pore volume relative to pore radius than is possessed by natural bone char.

Despite the suitability of such synthetic BCP adsorbents as substitutes for bone char, the cost of the synthetic hydroxyapatite is of prime importance in determining the cost of the product, and depending upon economic conditions it may at times be more advantageous for the sugar industry to use bone char. There remains, accordingly, the desirability of providing a sugar refining adsorbent comparable in performance to bone char and the above-described synthetic BCP products and which can better compete with such materials cost wise.

It is among the objects of this invention to provide sugar refining adsorbents possessing decolorizing and ash-removing powers, alkaline buffering capacity, density and hardness adapting them to sugar refining, that afford satisfactory substitutes for bone char and the synthetic hydroxyapatite adsorbents referred to above, that may be made easily from readily available materials, that compare in cost or can compete with synthetic hydroxyapatite adsorbents and bone char, and that may be made with standard and readily available equipment.

Another object is to provide sugar refining adsorbents in accordance with the foregoing object and which embody substantially improved distribution of pore volume to pore radius as compared with bone char and the synthetic basic calcium phosphate adsorbents.

Other objects will appear from the following specification.

The invention will be described with reference to the accompanying drawing in which the graphs show the relation of pore volume distribution to pore radius of a series of sugar refining adsorbents including one in accordance with this invention.

I have discovered, and it is upon this that the invention is largely predicated, that sugar refining adsorbents in accordance with the stated objects are supplied by compositions of steamed bone, clay of proper type, and, preferably, carbonizable organic material also, although not essential for all purposes. The adsorbents may be made by intimately mixing the three components, gauging them to appropriate plasticity with an inert liquid, such as water, forming them into shapes, and drying and heat hardening the shapes. Preferably the plastic mixture is formed into shapes by extrusion, the extruded product is then dried, crushed and screened to appropriate sizes that are then ultimately fired. As in the case of the synthetic BCP products described above, the heat hardening is conducted in the substantial absence of air at a temperature below that causing vitrification of the clay.

The clays used in the practice of the invention should be such as sinter to appropriate hardness and water insolubility at about 1100° to 1200° F. and which as a result of heating to that temperature develop a pH of about 8.0 to 9.5. Examples of clays suitable for this purpose are those known to the trade as Harwick No. 42, Tako Air Floated Colloidal Kaolin, and attapulgite clays such as those known as Florigel and Attaclay.

A variety of carbonizable organic materials may be used in the practice of the invention such, for example, as starch and sugar although for many purposes it is now preferred to use blackstrap molasses which affords a fully satisfactory carbonizable material at lower cost than other available materials of this class.

The steamed bone used in the practice of the invention is also known as de-gelatinized bone. It results from cooking raw animal bone for the commercial production of bone glue. A desirable feature of this material is that it normally contains residual organic material whereby the quantity of carbonizable material needed to give the desired proportion of carbon in the finished product is lessened with attendant reduction of product cost. The steamed bone is used in the customary form of meal, and it may be, by way of example, of such particle size as to be largely of minus 20-plus 200 mesh, with a substantial proportion, for instance 20 percent, of minus 200 mesh size.

Although the proportions of steamed bone, clay and carbonizable material may be varied, depending upon their composition and the particular combination of properties of the product, it is now preferred that the adsorbents of this invention be made from, by weight, about 60 to 80 percent of steamed bone meal, and about 15 to 20 percent of clay. Preferably, carbonizable material is used also in an amount not over about 20 percent, and generally not over about 10 percent. If the steamed bone contains enough organic matter to supply sufficient carbon no carbonizable matter need be added. Mixtures in those proportions may be brought to proper plasticity for development of adequate density and hardness with from about 44 to 48 pounds of water, and preferably 46 pounds, per 100 pounds of solids. These proportions supply adequate density and hardness in the final product, and in this way the production of the adsorbents of this invention differs from that of the aforementioned synthetic BCP adsorbents which require substantially more water for proper plasticizing.

In practice it has been found that adsorbents more coarsely porous than natural bone char retain their activity at a high level throughout a greater number of cycles of use and regeneration than does natural bone char. Therefore, in manufacturing a synthetic adsorbent of the bone char type it is of major importance to control the distribution of pore volume with respect to pore radius. Natural bone char is more finely porous than synthetic BCP adsorbents of the type produced under Patent No. 2,325,932. Consequently it would be supposed that the use of steamed bone would result in a product much like natural bone char in pore size distribution and, therefore, that it would give a product lacking the longer active life which is one of the advantages of synthetic BCP adsorbents. Nevertheless, I have discovered that, surprisingly enough, when steamed bone is used in place of synthetic BCP in adsorbent compositions including clay and carbonaceous organic material there results a product which is not only more coarsely porous than natural bone char but also more coarsely porous than adsorbents made similarly using synthetic BCP.

Moreover, the steamed bone products of this invention possess other advantages. The reasons for these advantages, which are contrary to expectation, are not presently known.

By way of example, reference is now made to the pore volume distribution curves of the accompanying drawing. These were obtained by the method described by Barrett and Joyner in 73 JACS 373 (1951) on samples of absorbents previously washed to remove water soluble impurities, and then dried. Curve 1 presents a typical natural bone char. Curve 2 shows the pore volume distribution of an adsorbent made by mixing, by weight, 65 percent of synthetic BCP, 20 percent of attapulgite clay, and 15 percent of starch, gauging with water, extruding under high intensity shearing stresses, drying the extrudate and then firing it as described in Patent No. 2,352,932. The BCP of that product contained about 50 percent of CaO, 30 percent of $P_2O_5$, and the balance water and impurities such as MgO. Curve 3 is representative of an adsorbent made with steamed bone according to the present invention, as follows: Seventy-four parts of steamed bone meal, twenty parts of attapulgite clay, and six parts of starch, all on the dry weight basis, were mixed with forty-five parts by weight of water. The mixture was then extruded, dried, sized and heated as described in Patent No. 2,352,932.

Inspection of the graphs shows the adsorbent made with steamed bone in accordance with this invention, curve 3, hereafter called adsorbent B, to possess more total pore volume in the desired range of pore radii (75 to 150 Angstroms) than either natural bone char (curve 1) or the adsorbent made with synthetic BCP (curve 2), hereafter called adsorbent A.

Data such as are embodied in the graphs of the drawing may be obtained in various ways. The total pore volume of any porous solid is measurable by a number of well-known procedures all of which depend upon filling the pores with a suitable fluid under conditions which permit measurement of the volume required to fill them. Helium, nitrogen and water are commonly used for this purpose. If both volume and area of the pores of a solid are known, an estimate of the average radius of the pores can be made by assuming them to be cylindrical since the area of the wall of a cylinder is related to its volume by the equation $r=2V/a$ where $r$ is the pore radius, $V$ is its volume and $a$ is its area. The area of the pore walls can be estimated from the low temperature nitrogen adsorption isotherm for the substance by the method of Brunauer, Emmett and Teller, 60 JACS 309 (1938), and the word "area" as used herein designates the surface available to nitrogen as determined by that method.

The distribution of pore volume and area with respect to pore radius can be determined by the aforementioned method described by Barrett and Joyner, 73 JACS 373 (1951). This depends upon computation of the volume of pores of various radii from the low temperature nitrogen desorption isotherm for the substance by the means of the Kelvin equation relating the vapor pressure depression of a liquid in a capillary to the radius of curvature of the liquid meniscus, and applying appropriate corrections for the physical adsorption of nitrogen which occurs regardless of the pore sizes. It is this method that was used in acquiring the data for the graphs of the accompanying drawing.

Concomitant with the unanticipated change in pore volume distribution due to steamed bone meal is a significant and unexpected improvement in retention of activity in a series of cycles of use and regeneration of adsorbents made in accordance with this invention. This is illustrated in the following table which compares the deterioration in performance of adsorbents A and B when they were used to decolorize sugar liquor, washed, regenerated by heating, and again used to decolorize sugar liquor in a series of ten cycles of use and regeneration.

*Results of use and reactivation experiments on adsorbents A and B*

| Cycle No. | Percent Color Removed | |
|---|---|---|
| | Adsorbent B—This Invention | Adsorbent A—Syn. BCP |
| 1 | 92.4 | 91.7 |
| 2 | 91.1 | 90.8 |
| 3 | 90.2 | 87.9 |
| 4 | 89.9 | 86.6 |
| 5 | 88.7 | 84.1 |
| 6 | 89.7 | 88.3 |
| 7 | 88.9 | 85.1 |
| 8 | 88.4 | 87.4 |
| 9 | 89.0 | 87.3 |
| 10 | 89.6 | 87.4 |
| 1–10 | 3.8 | 4.3 |

In examining these data it should be noted that it is the color not removed rather than the color removed that is important. The color not removed represents the work not done, i. e., remaining to be done. For example, in cycle 1 adsorbent B appears to have done only 7 parts in 917 parts more work than adsorbent A. However, if it is noted that 100.0—91.7=8.3 and 100.0—92.4=7.6 it will be realized that adsorbent A left 7/76 more color, equivalent to about 9 percent, to be removed than did adsorbent B. When the scale of operations in sugar refining is taken into account (individual U. S. refineries handle 2,000,000 to 6,000,000 pounds of raw sugar daily) it is apparent that a difference of 9 or 10 percent in color not removed is of great practical significance. Moreover, the difference in performance of the two adsorbents increases markedly with cycles of use and regeneration. In cycle 10 the figures to be compared are 100—89.6=10.4 and 100—87.4=12.6, corresponding to $(12.6-10.4) \times 100 \div 10.4 = 21.2\%$ more color remaining after treatment with adsorbent A than after treatment with adsorbent B.

Another advantage of adsorbent B is that it is superior to adsorbent A in refining low test sugar liquors and is slightly superior to bone char in this application. Adsorbent A, on the other hand, while superior to bone char when used on high test sugar liquors, is slightly inferior to bone char on low test liquors. Typical decolorizations obtained under controlled test conditions using a high grade Cuban raw sugar for example would be as follows:

| | Percent |
|---|---|
| Adsorbent B | 94.1 |
| Adsorbent A | 92.9 |
| Bone char | 92.2 |

Using a Number 13 soft sugar liquor as an example of low test material, typical results are:

| | Percent |
|---|---|
| Adsorbent B | 94.6 |
| Adsorbent A | 92.2 |
| Bone char | 94.2 |

Therefore, it appears that adsorbent B represents an improvement not only over bone char but over adsorbent A as well.

Although reference has been made to steamed bone meal, it will be understood that other natural hydroxyapatites of comparable porosity may be used. However, fluorapatites are unsatisfactory for such purposes because they exhibit very low refining activity.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. That method of making a sugar refining adsorbent comprising the steps of forming an intimate mixture of, by weight, about 60 to 80 percent of steamed bone meal, about 15 to 20 percent of clay, and from zero to 20 percent of carbonizable organic material, gauging the mixture with water to render it plastic, extruding the plastic mixture to form shapes, and firing the shapes in the substantial absence of air to harden them at a temperature below that which said clay vitrifies.

2. A method according to claim 1, about 44 to 48 pounds of water being supplied per 100 pounds of solids.

3. Heat hardened granular adsorbent material formed from a a homogeneous mixture of about 60 to 80 percent of steamed bone meal, about 15 to 20 percent of clay, and up to 10 percent of carbonizable organic material, the granules being substantially homogeneous, the granules having substantially more total pore volume in the range of pore radii from about 70 to 150 Angstroms and improved decolorizing power for sugar liquors as compared with either bone char of sugar refining grade or synthetic sugar refining adsorbent made in the same way as said granules from basic calcium phosphate at least as basic as hydroxyapatite, clay and carbonizable organic material.

4. Adsorbent according to claim 3, said clay being an attapulgite.

References Cited in the file of this patent

UNITED STATES PATENTS

| | | |
|---|---|---|
| 122,526 | Kelsey | Jan. 9, 1872 |
| 686,248 | Barnes | Nov. 12, 1901 |
| 1,899,339 | Klebert | Feb. 28, 1933 |
| 2,127,702 | Schmidt | Aug. 23, 1938 |
| 2,219,581 | Schmidt | Oct. 29, 1940 |
| 2,226,421 | Barrett et al. | Dec. 24, 1940 |
| 2,352,932 | Barrett et al. | July 4, 1944 |
| 2,444,571 | Leslie | July 6, 1948 |

FOREIGN PATENTS

| | | |
|---|---|---|
| 254,262 | Great Britain | Oct. 28, 1926 |

U. S. DEPARTMENT OF COMMERCE
PATENT OFFICE

CERTIFICATE OF CORRECTION

Patent No. 2,831,818    Elliott P. Barrett    April 22, 1958

It is hereby certified that error appears in the printed specification of the above numbered patent requiring correction and that the said Letters Patent should read as corrected below.

Column 3, line 44, for "Patent No. 2,325,932" read -- Patent No. 2,352,932 --;  column 6, line 17, after "that" insert -- at --;  line 26, for "70 to 150" read -- 75 to 150 --.

Signed and sealed this 17th day of June 1958.

(SEAL)
Attest:

KARL H. AXLINE
Attesting Officer

ROBERT C. WATSON
Commissioner of Patents